US010630221B2

(12) United States Patent
Aizawa et al.

(10) Patent No.: US 10,630,221 B2
(45) Date of Patent: Apr. 21, 2020

(54) MOTOR CONTROL DEVICE

(71) Applicant: KABUSHIKI KAISHA TOSHIBA, Minato-ku (JP)

(72) Inventors: Toshimitsu Aizawa, Yokohama (JP); Makoto Shinohara, Kawasaki (JP); Shigeru Nakajima, Zama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/658,886

(22) Filed: Jul. 25, 2017

(65) Prior Publication Data

US 2018/0034400 A1 Feb. 1, 2018

(30) Foreign Application Priority Data

Jul. 27, 2016 (JP) .................................. 2016-147334

(51) Int. Cl.
*H02P 25/092* (2016.01)
*H02P 25/098* (2016.01)
(Continued)

(52) U.S. Cl.
CPC .......... *H02P 25/092* (2016.02); *H02P 25/098* (2016.02); *H02P 27/04* (2013.01); *H02M 7/5395* (2013.01); *H02P 2209/09* (2013.01)

(58) Field of Classification Search
CPC ...... H02P 25/092; H02P 25/098; H02P 27/04; H02P 2209/09; H02M 7/5395
(Continued)

(56) References Cited

U.S. PATENT DOCUMENTS 4,123,692 A * 10/1978 Gilmore ................ H02M 3/158
318/722
5,754,024 A 5/1998 Sugiyama
(Continued)

FOREIGN PATENT DOCUMENTS

EP  0 736 962 A2  10/1996
JP  09-182490 A   7/1997
(Continued)

OTHER PUBLICATIONS

Extended European Search Report dated Dec. 5, 2017 in European Patent Application No. 17182760.3, 8 pages.
(Continued)

*Primary Examiner* — Eduardo Colon Santana
*Assistant Examiner* — Zemenay T Truneh
(74) *Attorney, Agent, or Firm* — Oblon, McClelland, Maier & Neustadt, L.L.P.

(57) ABSTRACT

A motor control device including a PWM generator generating a PWM generator generating a PWM signal to be outputted to a drive circuit that energizes a winding of a switched reluctance motor; a rectangular wave generator outputting a rectangular wave signal of 1 pulse or more to the drive circuit in 1 drive period of each phase based on a rotational position of the motor; and a drive signal switcher executing switching so that a PWM drive by the PWM signal is performed when a rotational speed of the motor is equal to or less than a threshold value and a rectangular wave drive by the rectangular wave signal is performed when the rotational speed of the motor is greater than the threshold value. The PWM generator synchronizes a timing to start generation of a carrier of the PWM signal with rising of the rectangular wave signal.

4 Claims, 21 Drawing Sheets

(51) Int. Cl.
*H02P 27/04* (2016.01)
*H02M 7/5395* (2006.01)

(58) Field of Classification Search
USPC ...................................................... 318/254.1
See application file for complete search history.

(56) References Cited

U.S. PATENT DOCUMENTS

| | | | | |
|---|---|---|---|---|
| 6,008,601 | A * | 12/1999 | Sugiyama | B60L 3/0023 318/254.2 |
| 7,608,964 | B2 * | 10/2009 | Yamagiwa | H02K 21/24 310/156.32 |
| 2013/0187583 | A1 * | 7/2013 | Iwatsuki | H02P 6/10 318/400.17 |
| 2017/0002881 | A1 * | 1/2017 | Masuda | F16D 65/18 |

FOREIGN PATENT DOCUMENTS

| | | |
|---|---|---|
| JP | 2000-23481 A | 1/2000 |
| JP | 2007-166830 A | 6/2007 |
| JP | 2009-112140 A | 5/2009 |
| JP | 2009112140 * | 5/2009 |
| JP | 2010-246336 A | 10/2010 |
| JP | 2012-125096 A | 6/2012 |
| WO | WO 90/16111 | 12/1990 |
| WO | WO 2011/161408 A2 | 12/2011 |

OTHER PUBLICATIONS

Office Action dated Jun. 25, 2019 in Japanese Patent Application No. 2016-147334.
Japanese Office Action dated Feb. 5, 2019 in Japanese Patent Application No. 2016-147334, 3 pages.
European Office Action dated Feb. 5, 2020 in European Patent Application No. 17 182 760.3.

* cited by examiner

| OUTPUT MODE | | UPPER-SIDE GATE SIGNAL | LOWER-SIDE GATE SIGNAL | BACK FLOW MODE |
|---|---|---|---|---|
| PWM | P(1) | PWM | PWM | ABSENT |
| | P(2) | PWM | RECTANGULAR (1 PULSE) | PRESENT |
| | P(3) | RECTANGULAR (1 PULSE) | PWM | PRESENT |
| RECTANGULAR WAVE | R(1) | PLURAL PULSES (INCLUDING 1 PULSE) | PLURAL PULSES (INCLUDING 1 PULSE) | ABSENT |
| | R(2) | PLURAL PULSES (INCLUDING 1 PULSE) | RECTANGULAR (1 PULSE) | PRESENT |
| | R(3) | RECTANGULAR (1 PULSE) | PLURAL PULSES (INCLUDING 1 PULSE) | PRESENT |

FIG. 6

MOTOR CONTROL DEVICE

CROSS-REFERENCE TO RELATED APPLICATION(S)

This application is based upon and claims the benefit of priority from Japanese Patent Application No. 2016-147334, filed on, Jul. 27, 2016 the entire contents of which are incorporated herein by reference.

FIELD

Embodiments disclosed herein relate to a motor control device for controlling a switched reluctance motor.

BACKGROUND

There are various types of motors such as a brushed DC motor which uses a magnet, a brushless DC motor, an induction motor which does not use a magnet, and a switched reluctance motor. The switched reluctance motor is hereinafter referred to as an SR motor. Since the SR motor does not use a magnet, it has the advantages of (1) being at structurally simple, low coat, and robust, (2) being capable of high-speed rotation, (3) being usable at high temperatures, and (4) being easy to recycle.

On the other hand, the SR motor has the disadvantages of (1) having large torque ripples due to the salient pole structure and having large drive noise, (2) having poor power factor, (3) requiring stringent precision in processing metal plates for forming gaps, etc., (4) requiring a dedicated drive circuit, and (5) being difficult to control due to strong non-linearity. In order to drive the SR motor, it is required to switch the energization phase based on rotational angle. It is possible to control the resulting torque by controlling the energization timing, current waveforms, etc.

For example, Japanese patent application publication H09-182490 suggests the following solution for reducing drive noise which is one of the disadvantages of the SR motor. That is, in a configuration in which energization of the motor winding is permitted based on a turn-on of a signal determining the timing for exciting the motor winding and in which the current value flowing through the motor winding is controlled based on a PWM signal, the timing for starting the PWM signal is synchronized with the rising of the signal determining the excitation timing from off to on.

However, it is not be possible for the above described approach to control current in regions where the motor rotates at high speeds. In case of a three-phase SR motor having 12 stator salient poles and 8 rotor salient poles for example, the energization phase needs to be switched 24 times per 1 rotation. The time required to switch the energization phase amounts to 416.7 μs at 6000 rpm and 41.7 μs at 60000 rpm. In such case, 8 pulses can be outputted at 6000 rpm but only 1 pulse can be outputted at 60000 rpm when the frequency is 20 kHz.

BRIEF DESCRIPTIONS OF THE DRAWINGS

FIG. 6 is a chart providing a list of output modes.

DESCRIPTION

There is provided a motor control device capable of sufficiently controlling current even in regions where the switched reluctance motor rotates at high speeds.

A motor control device of one embodiment includes a PWM generator generating a PWM signal to be outputted to a drive circuit that energizes windings of a switched reluctance motor; a rectangular wave generator outputting a rectangular wave signal of 1 pulse or more to the drive circuit in 1 drive period of each phase based on a rotational position of the motor; and a drive signal switcher executing switching so that a PWM drive by the PWM signal is performed when a rotational speed of the motor is equal to or less than a threshold value and a rectangular wave drive by the rectangular wave signal is performed when the rotational speed of the motor is greater than the threshold value. The PWM generator synchronizes a timing to start generation of a carrier of the PWM signal with rising of the rectangular wave signal.

Figure 11:
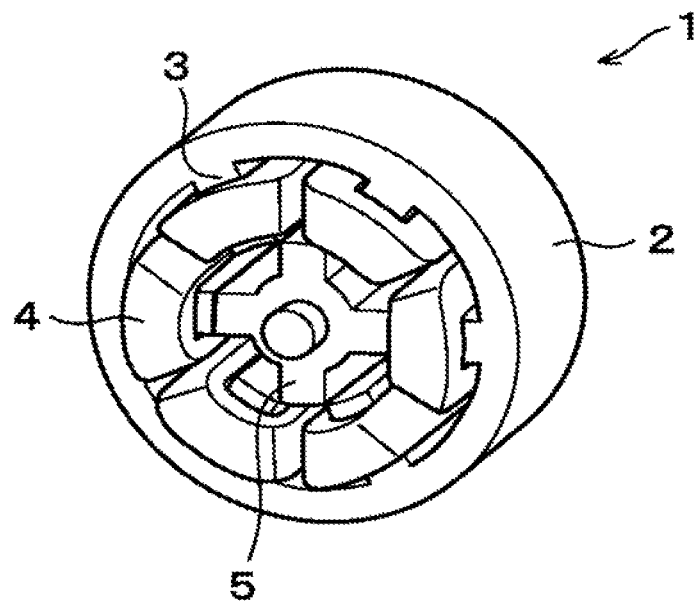
FIG. 11 is a perspective view illustrating the structure of the SR motor.

A description will be given hereinafter on one embodiment with reference to the drawings. FIG. 11 is a perspective view illustrating the structure of an SR motor. An SR motor 1 is provided with a plurality of salient poles 3 protruding toward the inner peripheral side of a stator core 2 having a substantially annular cross section. Windings 4 for each of the phases are wound around the salient poles 3. A rotor core 5 having a substantially cruciform cross section is disposed in a hollow portion of the stator core 2. The SR motor 1 exhibits a doubly salient pole structure having protrusions and recesses on both the stator core 2 and the rotor core 5.

Figure 12:
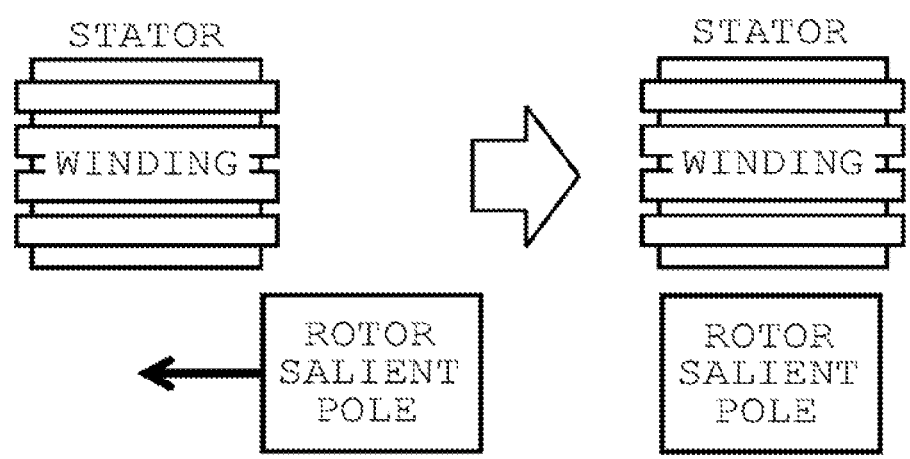
FIG. 12 is an explanatory diagram on the operation of the SR motor.

FIG. 12 is an explanatory diagram on the operation of the SR motor. When the stator winding in energized, torque and rotational force are exerted in the direction to align the salient poles in the stator side with the salient poles in the rotor side. Magnetic resistance is minimized and torque amounts to zero when the salient poles of the two sides are aligned. In other words, a mechanical action that works to reduce the magnetic resistance is exerted on the energized salient poles.

Torque T of the SR motor is generally expressed by the following equation (1).

$$T=I^2/2(dL/d\theta) \quad (1)$$

In the equation, T represents torque, I represents current, L represents inductance, and θ represents rotor position. It can be understood from equation (1) that positive torque can be obtained by conducting current through the windings while inductance is increased with respect to the rotor position.

Figure 13:
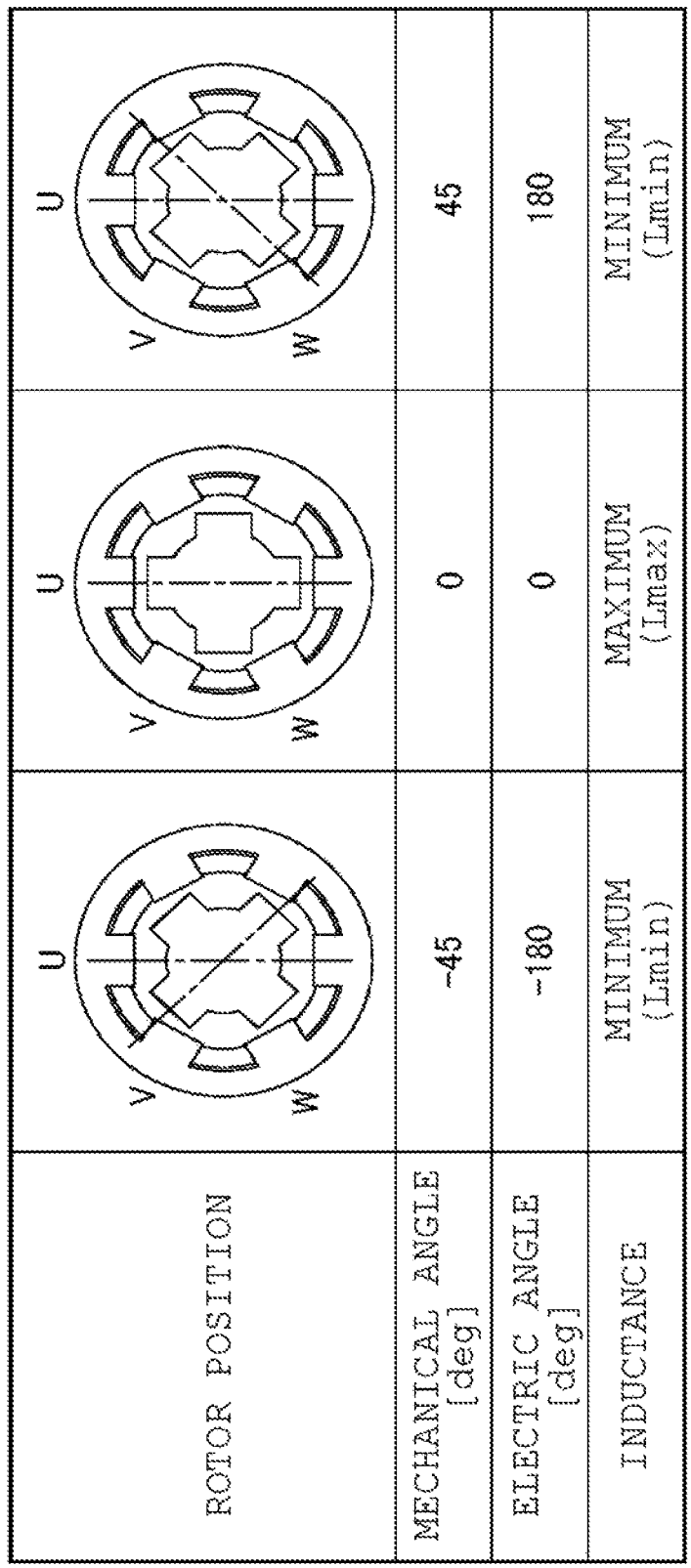
FIG. 13 is a chart illustrating the relation between inductance and the rotor position of an SR motor having 6 stator poles and 4 rotor poles.
Figure 14:
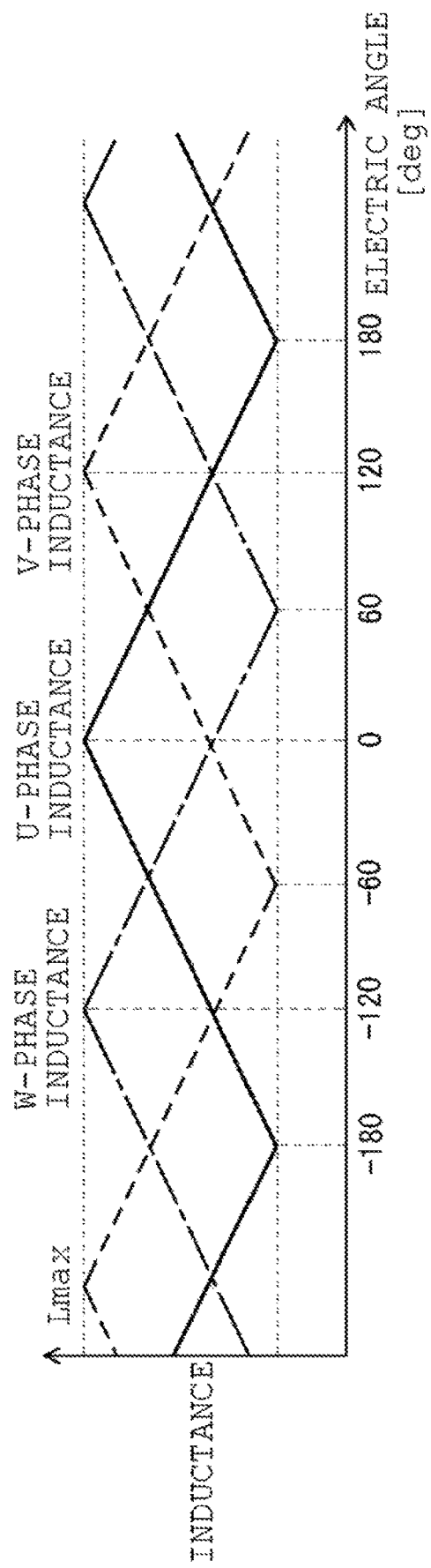
FIG. 14 is a chart illustrating how inductance varies in each phase with variation of electric angle.

FIG. 13 illustrates the relation between inductance and the rotor position of an SR motor having 6 stator poles and 4 rotor poles. When assuming that the state in which the stator salient poles and the rotor salient poles of the U phase are aligned is represented by a mechanical angle of 0 degrees, the U-phase inductance is maximized at such state and minimized when rotated by ±45 degrees in mechanical angle, in other words, ±180 degrees in electric angle. In the U phase, positive torque is generated when the electric angle ranges from −180 degrees to 0 degrees and negative torque is generated when the electric angle ranges from 0 degrees to 180 degrees. Thus, after energizing the U phase, a switch is made to energize the V phase before reaching the electric angle of 0 degrees at which the U-phase inductance is maximized and a switch is made to energize the W phase before reaching the electric angle of 120 degrees at which the V-phase inductance is maximized. By switching the energization phase from U→V→W→U→ . . . in the above described manner, it is possible to rotate the rotor in the CW (clockwise) direction. FIG. 14 shown how the inductance of each phase varies with the variation of the electric angle.

Figure 7:
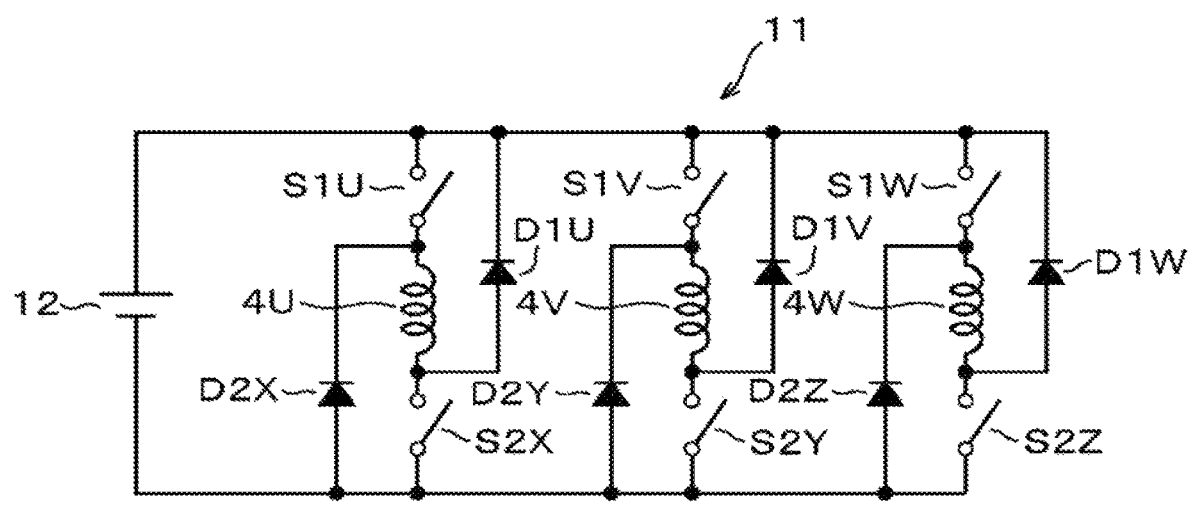
FIG. 7 illustrates a general drive circuit of an SR motor.

FIG. 7 shows a general drive circuit of an SR motor. A drive circuit 11 of the SR motor includes a positive side switch S1 (S1U, S1V, S1W) and a negative side switch 32 (S2X, S2Y, S2Z) for each of the U phase, V phase, and the W phase. One end of the positive side switch S1 is connected to a positive terminal of a direct-current (DC) power supply 12 and one end of the negative side switch S2 is connected to a negative terminal of a DC power supply 12. Windings 4 of each of the phases are connected between the other ends of the switches S1 and S2. Switches S1 and S2 are configured by a semiconductor element such as a MOSFET. The cathode of a diode D1 (D1U, D1V, D1W) is connected to the positive terminal of the DC power supply 12 and the anode of the diode D1 is connected to the other end of the switch S2. The anode of a diode D2 (D2X, D2Y, D2Z) is connected to a negative terminal of the DC power supply 12 and the cathode of the diode D2 is connected to the other end of the switch S1.

Figure 8:
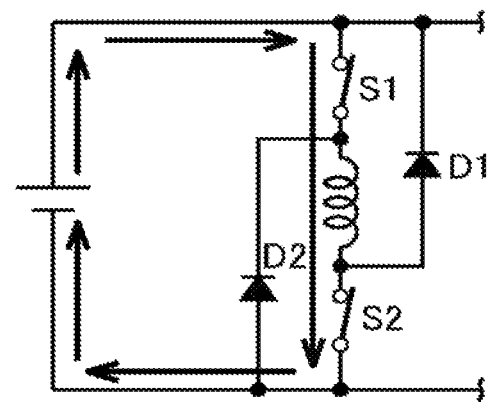
FIG. 8 illustrates a positive voltage application mode of the drive circuit.
Figure 9:
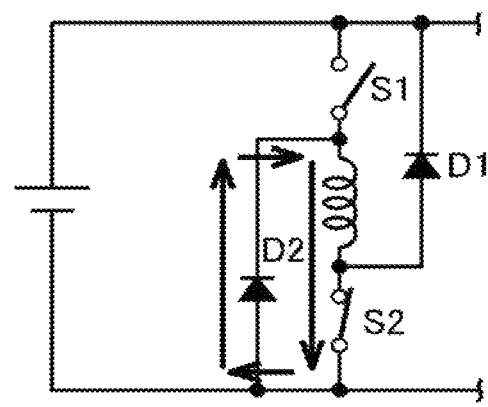
FIG. 9 illustrates a back flow mode of the drive circuit.
Figure 10:
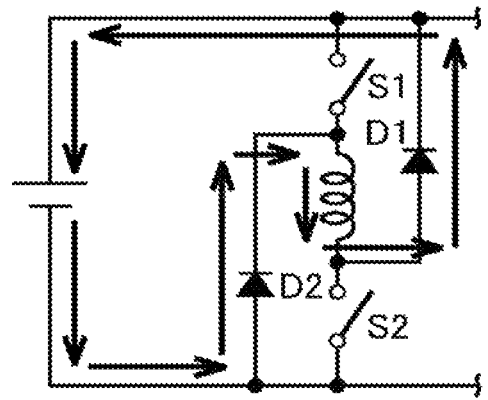
FIG. 10 illustrates a negative voltage application mode of the drive circuit.

FIGS. 8 to 10 indicate energization modes of the drive circuit 11. As indicated in FIG. 8, positive voltage is applied to the windings 4 to cause conduction of current when the switches S1 and S2 in the upper side and the lower side are turned on. When only the upper switch S1 is turned off from this state as illustrated in FIG. 9, back flow current flows via the diode D2 in the lower side. Similarly, by turning off the switches S1 and S2 in the upper side and the lower side as indicated in FIG. 10 from the state in which current is conducted through the windings, negative voltage is applied to the windings via the diodes D1 and D2 in the upper side and the lower side to cause current to be regenerated to the power supply.

Figure 1:
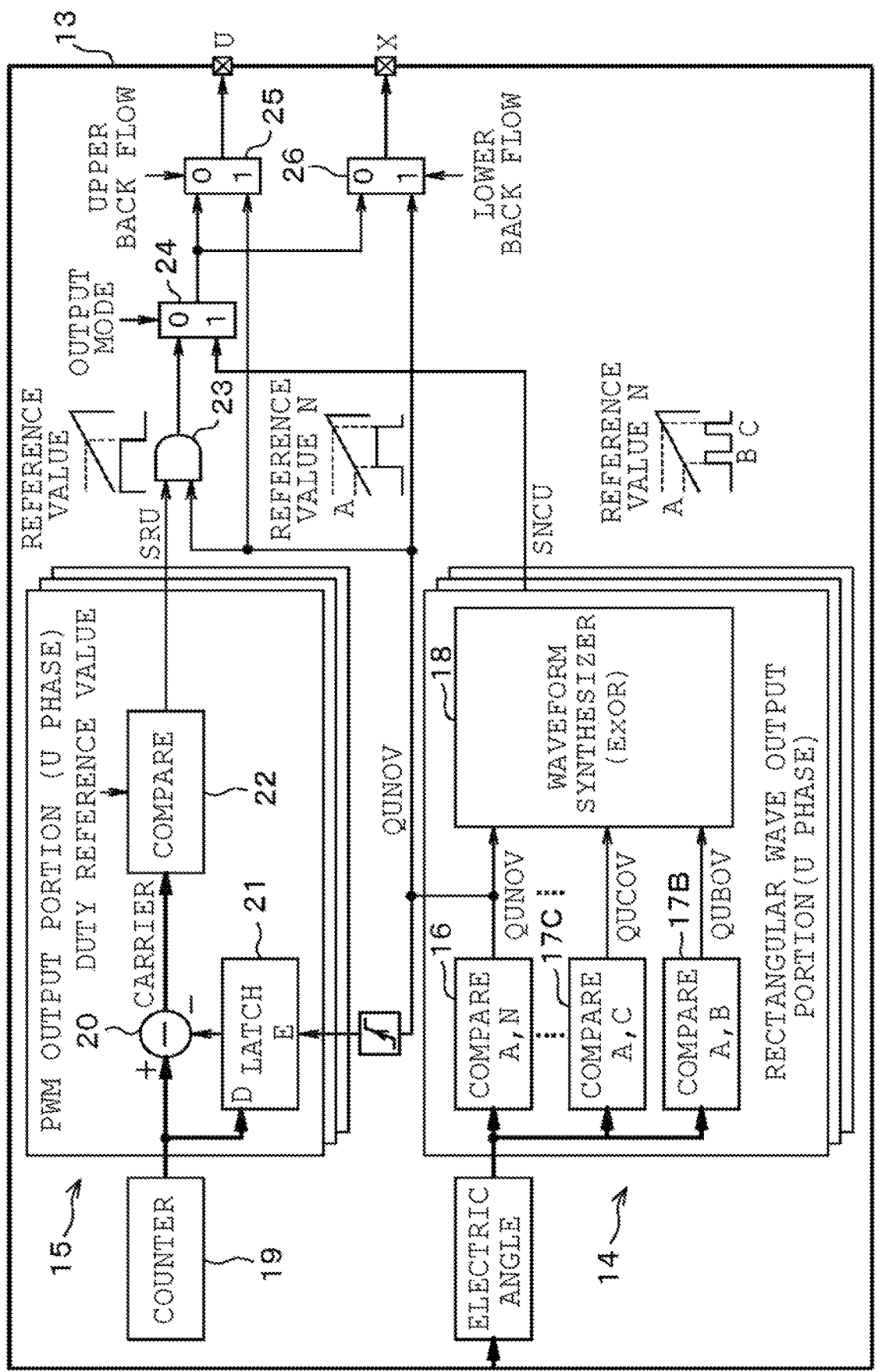
FIG. 1 is a functional block diagram illustrating the main portion of a motor control device according to one embodiment.

FIG. 1 is a functional block diagram illustrating the main portion of a motor control device 13. The motor control device 13 includes a rectangular wave output portion 14 and a PWM (Pulse Width Modulation) output portion 15 for generating drive signals to be outputted to the drive circuit 11. A description will be given hereinafter only for the U phase since all three phases share the same configuration.

The rectangular wave output portion 14 generates a rectangular wave signal by comparing the reference value of the waveform to be outputted which is given by a CPU not shown with the electric angle of the SR motor 1. The reference values A and N set to a comparator 16 correspond to the electric angle at the start point of output of the rectangular wave signal and the electric angle at the end point of output of the rectangular wave signal, respectively. That is, by providing reference values A and N, it is possible to specify the output period of the rectangular wave signal. The reference values A, B, and C set to comparators 17B and 17C determine the pulse waveform outputted in the aforementioned output period. The output signals of the comparators 16, 17B, and 17C are all inputted to a waveform synthesizer 18 and the waveform synthesizer 18 outputs a rectangular wave signal SNCU by taking an exclusive OR of the inputted signals.

Figure 3:
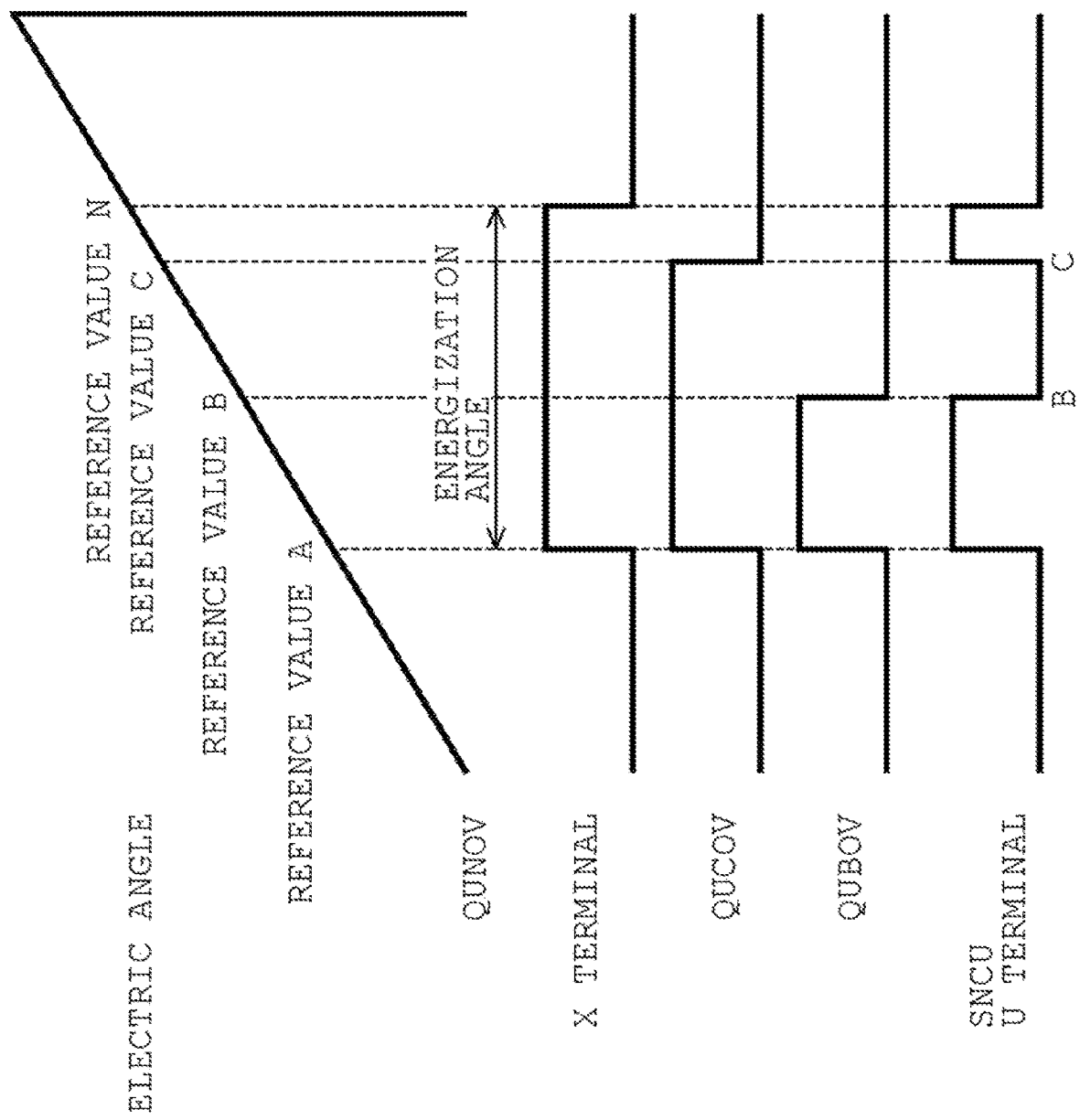
FIG. 3 is a timing chart indicating the operation of a rectangular wave output portion.

When output ting a wave form exemplified in FIG. 1, reference values B and C are set so that A<B and C<N as indicated in FIG. 3. As a result, signals QUBOV and QUCOV outputted from the comparator 17 at electric angle A are raised. Rectangular wave signal SNCU outputted from the waveform synthesizer 18 is also raised.

When the signal QUBOV falls at electric angle B from this state, the rectangular wave signal SNCU falls as well. Then, when the signal QUCOV falls at electric angle C, the rectangular wave signal SNCU rises and when the signal QUCOV falls at electric angle N, the rectangular wave signal SNCU falls as well. As a result of the input signals being synthesized at the waveform synthesizer 18, the rectangular wave signal SNCU exhibits a waveform which turns to a high level in the ranges spanning between electric angle A and B and between electric angle C and N. By adopting the above described configuration, the rectangular wave output portion 14 is capable of outputting different waveforms when outputting plural rectangular wave pulses in 1 drive period try individually setting the rise and fall timings for each phase.

On the other hand, the PWM output portion 15 is provided with a counter 19 that generates a saw-tooth wave serving as a PWM carrier. The count value of the counter 19 is inputted to a subtractor 20 and a data latch 21. The data latch 21 uses the rising edge of the QUNOV signal outputted from the comparator 16 of the rectangular wave output portion 14 as a trigger for latching the inputted count value. The subtractor 20 subtracts the count value latched by the data latch 21 from the count value of the counter 19 and inputs the difference to the comparator 22. Thus, the data value of the carrier outputted via the subtractor 20 amounts to zero at the timing when the output of the rectangular wave signal is started.

Figure 2:
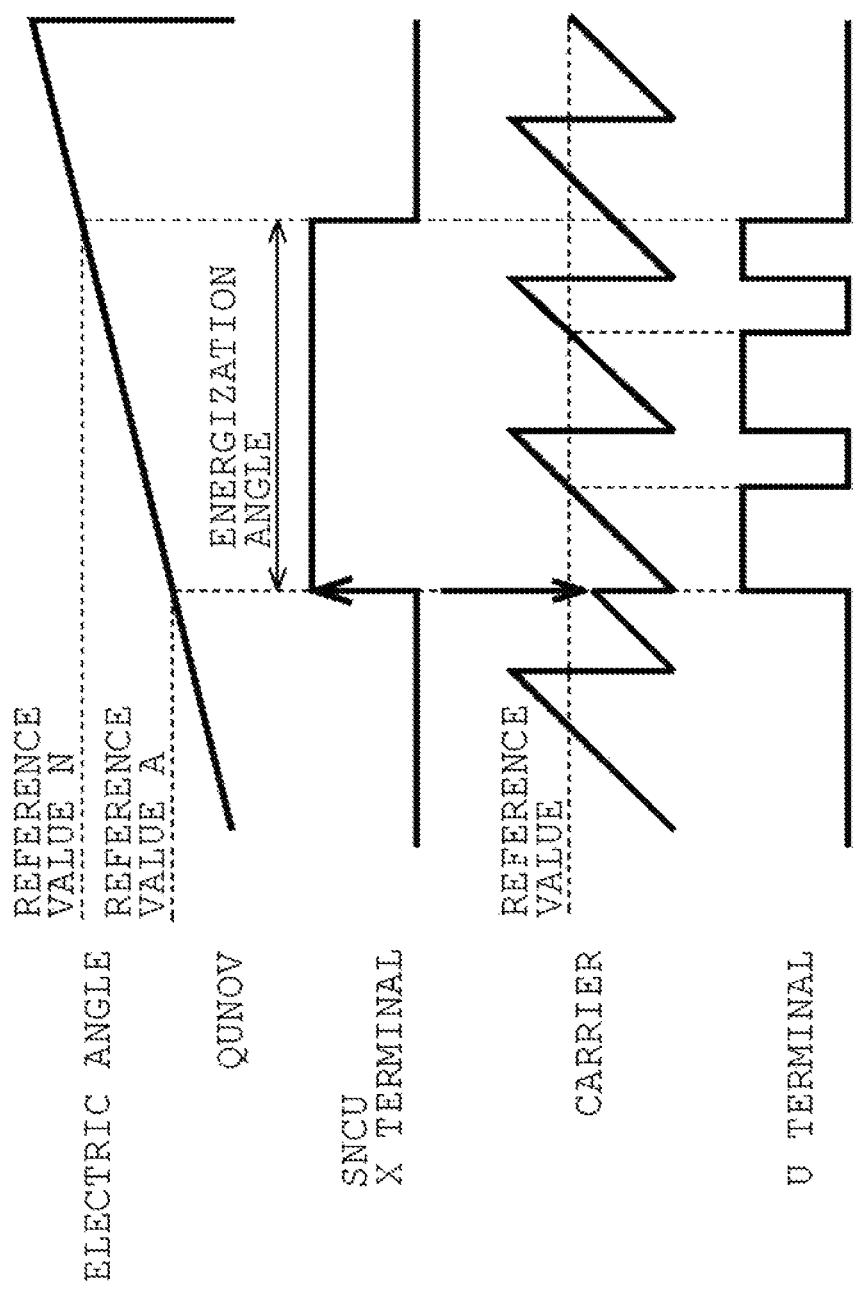
FIG. 2 is a timing chart indicating the operation of a PWM output portion.

The comparator 22 generates a PWM signal SRU by comparing the date value of the above described earlier and the duty reference value set by the CPU and inputs the signal SRU to one of the input terminals of the AND gate 23. The signal QUNOV is inputted to the other input terminal of the AND gate 23. Thus, the PWM signal SRU is outputted during the period in which the signal QUNOV indicates the high level. FIG. 2 illustrates one example of a PWM signal outputted from a U terminal.

Three selectors 24, 25, and 26 are disposed in the output side of the AND gate 23. The output signal (0) of the AND gate 23 and the rectangular wave signal SNCU (1) are inputted to the selector 24 and the output signal (0) of the selector 24 and the signal QUNOV (1) are inputted to the selectors 25 and 26. The selector 25 outputs a control signal to the switch S1U in the upper side U phase of the drive circuit 11 and the selector 26 outputs a control signal to the switch S2X in the lower side U phase of the drive circuit 11.

The selector 24 selects the PWM signal SRU when the output mode is "PWM" and the selection signal is "0" and selects the rectangular wave signal SNCU when the output mode is "rectangular wave" and the selection signal is "1". The selector 25 selects the selector 24 side when the output mode is "upper side back flow" and the selection signal is "0" and selects the signal QUNOV when the output mode is not "upper side back flow" and the selection signal is "1". The selector 26 selects the selector 24 side when the output mode is "lower side back flow" and the selection signal is "0" and selects the signal QUNOV when the output mode is not "lower side back flow" and the selection signal is "1".

As illustrated in FIG. 6, there are six types of output modes for the gate signal, namely, modes P(1) to P (3) and modes R(1) to R(3). When PWM signals or rectangular wave signals having the same waveform are outputted in the upper side and the lower side as in the case of output modes P(1) and R(1), the back flow mode illustrated in FIG. 9 is not executed. When the back flow mode is to be executed in the output modes R(2) and R(1), only 1 pulse spanning across the signal output period is outputted to either of the upper side or the lower side by the rectangular wave output portion 14. In the PWM output mode, the timing of the initial rising of the PWM signal is synchronized with the rising of the rectangular wave signal generated by the rectangular wave output portion 14. The switching of the output mode may also be done by the CPU. However, the switching may be conducted automatically through hardware configuration by comparing the PWM frequency, the electric angle period, and the pulse count of the rectangular wave output.

Figure 4:
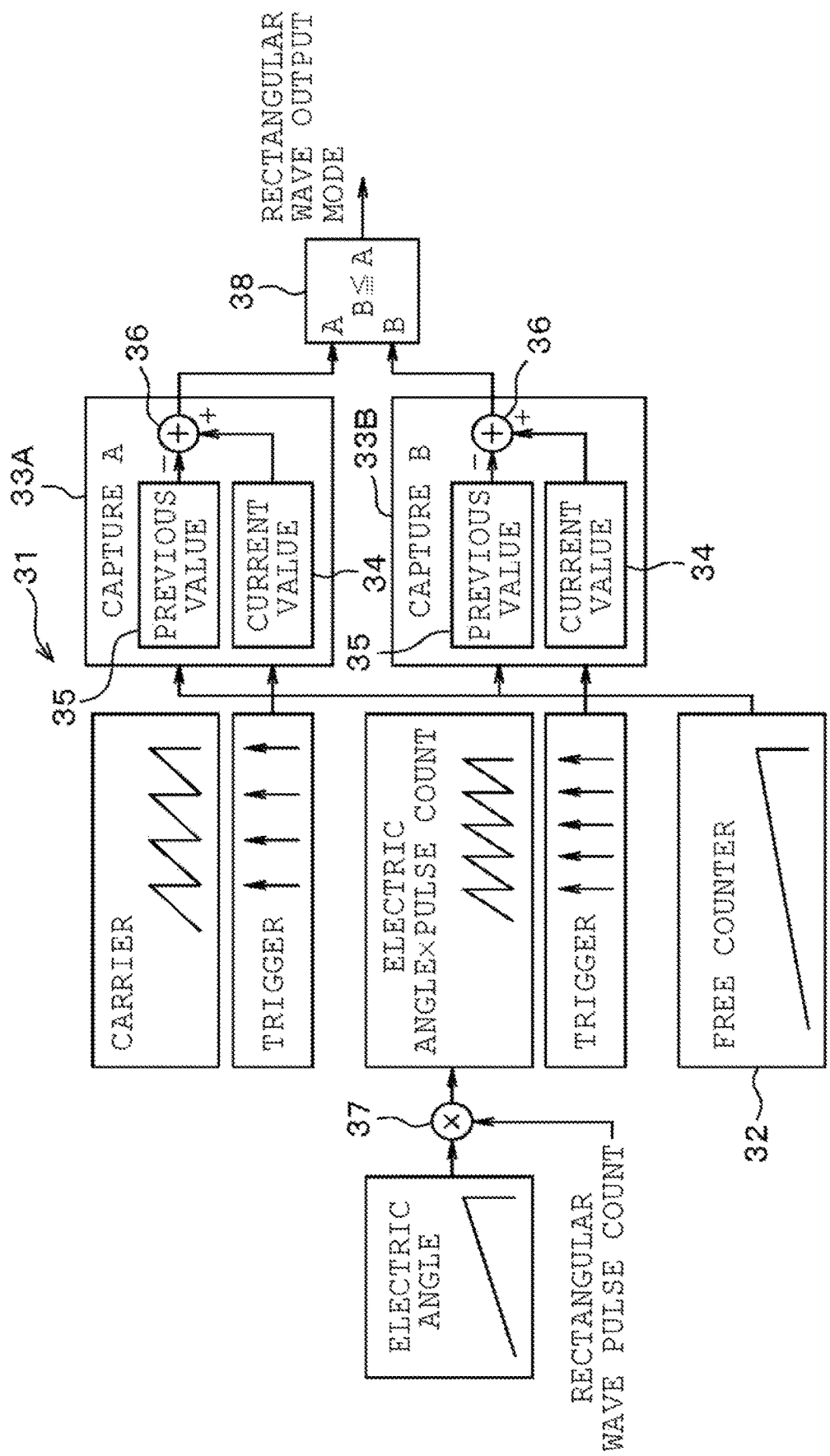
FIG. 4 is a functional block diagram illustrating the configuration of a drive signal switching portion.
Figure 5:
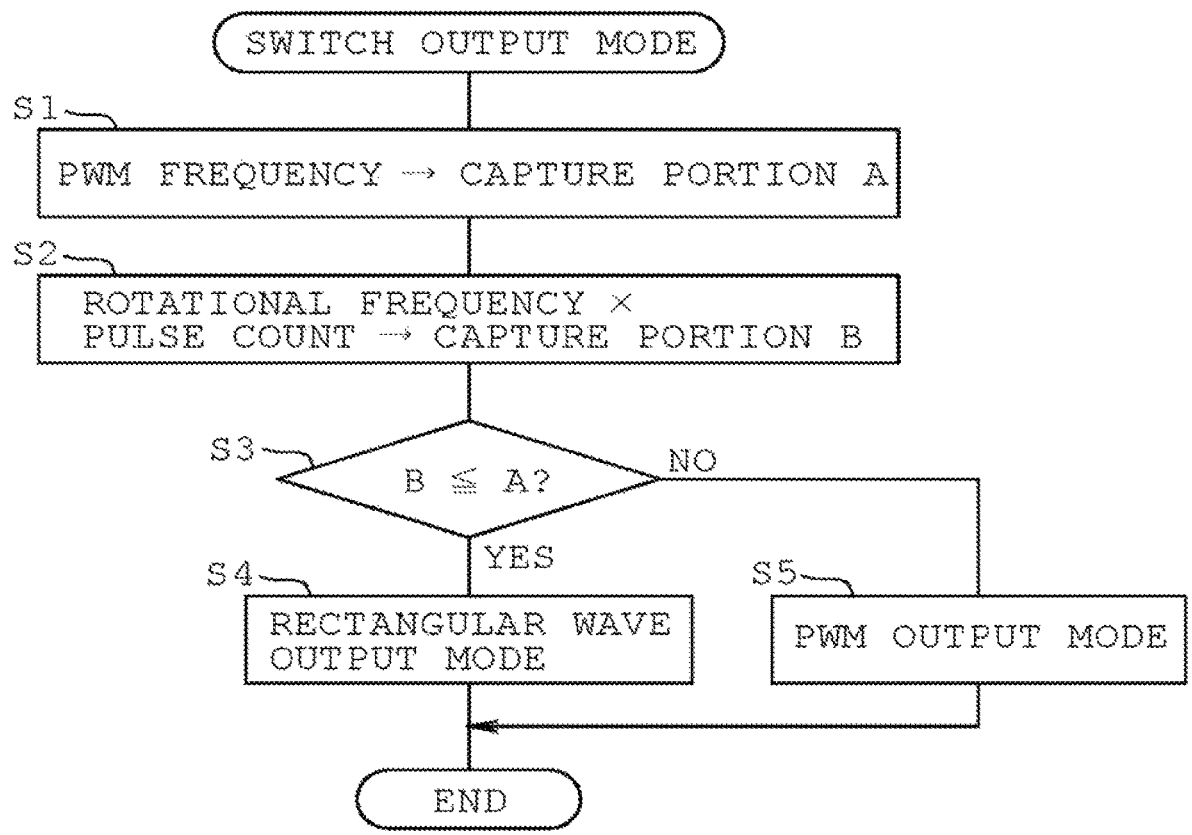
FIG. 5 is a flowchart indicating operations performed by the drive signal switching portion.

Next, a description will be given on the switching of the output mode conducted by hardware with reference to FIGS. 4 and 5. FIG. 4 is a functional block diagram illustrating the configuration of a drive signal switcher 31. FIG. 5 is a flowchart describing the operations performed by the configuration illustrated in FIG. 4. The drive signal switcher 31 is provided with capture portions 33A and 33B and a free counter 32. The capture portions 33A and 33B capture the count value of the free counter 32 and are both provided with a current value register 34, a previous value register 35, and a subtractor 36.

In the capture portion 33A, when the count value of the PWM carrier reaches the maximum value, data is transferred from the current value register 34 to the previous value register 35 and the count value of the free counter 32 is stored in the current value register 34. The subtractor 36 subtracts the register value of the previous value register 35 from the register value of the current value register 34. The capture portion 33A captures the count data corresponding to the frequency of the PWM carrier (S1) in the above described manner.

In the capture portion 33B, on the other hand, data value indicating the rotational angle and the electric angle of the SR motor 1 is multiplied by the pulse count of the rectangular using a multiplier 37 to generate multiplication waveform data. Then, in the capture portion 33B, when the count value of the multiplication waveform data reaches the maximum value, data is transferred from the current value register 34 to the previous value register 35 and the count value of the free counter 32 is stored in the current value register 34. Thus, the capture portion 33B captures count data corresponding to (motor rotational angle)×(rectangular wave pulse count) (S2).

The output data of the capture portions 33A and 33B is inputted to a magnitude comparator 38. The magnitude comparator 38 outputs a signal "1" for selecting the rectangular wave mode when capture data B is equal to or less than capture data A (S3: YES) (S4) and outputs a signal "0" for selecting the PWM mode when the capture data B is greater than capture data A (S3: NO) (35). The capture portions 33A and 33B and the comparator 38 correspond to a frequency comparator.

In a case of a three-phase SR motor having 12 stator salient poles and 9 rotor salient poles for example, the energization phase needs to be switched 24 times per 1 rotation. When assuming that pulse count in 1 energization period is 7 and the PWM frequency is 20 kHz, a switch is made from the PWM mode to the rectangular wave mode when the rotation count of the motor is increased to approximately 7100 rpm (=20 kHz×60/(7 pulses×24)).

Figure 15:
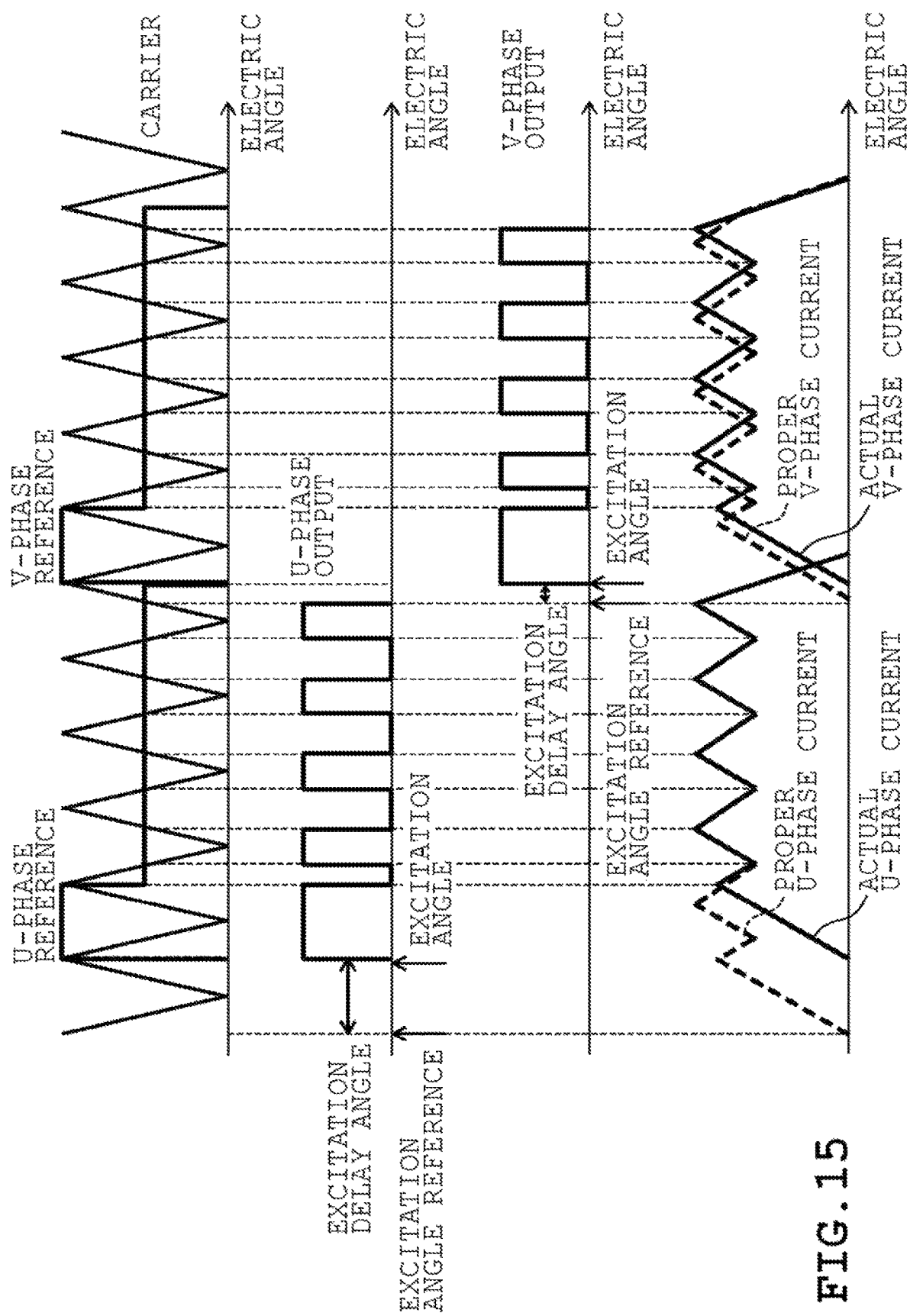
FIG. 15 illustrates waveforms representing a case in which the PWM signal and the rectangular wave signal are not synchronized and the PWM carrier is the same for each phase.

Next, the operation of the present embodiment is described with reference to FIGS. 15 to 24. However, FIG. 15 does not correspond to the present embodiment. FIG. 15 illustrates the waveforms being outputted in the case where the PWM signal and the rectangular wave signal are not synchronized and the PWM carrier is the same for all of the phases. The timing in which a reference excitation angle is given in the accompanying figures coincides with the timing in which the output of the rectangular wave signal is started. In the case illustrated in FIG. 15 on the other hand, the rise timing of the actual phase current is delayed from the proper rise timing because of the delay in the timing to start output of the PWM signal.

Figure 16:
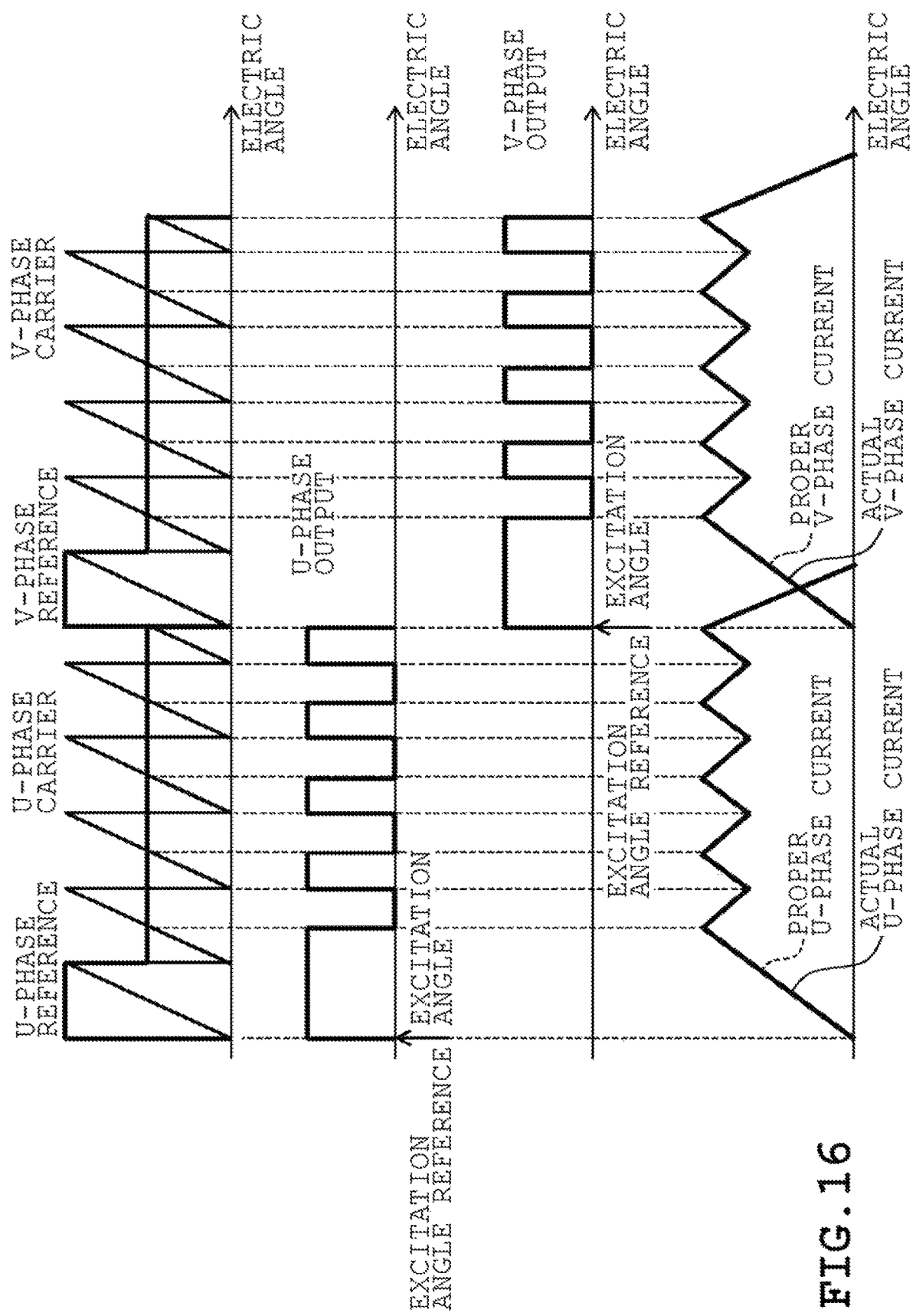
FIG. 16 is a timing chart illustrating the operation of the present embodiment (part 1).

According to the present embodiment, the timing to start output of the PWM signal coincides with the timing to start output of the rectangular wave signal as illustrated in FIG. 16 since the PWM carrier of each phase is reset at the timing to start output of the rectangular wave signal and the timing when the reference excitation angle is given. This eliminates the delay in the rising of phase current which has been exemplified in FIG. 15. It is to be noted that "reference" indicated in the figures correspond to the duty reference value.

Figure 17:
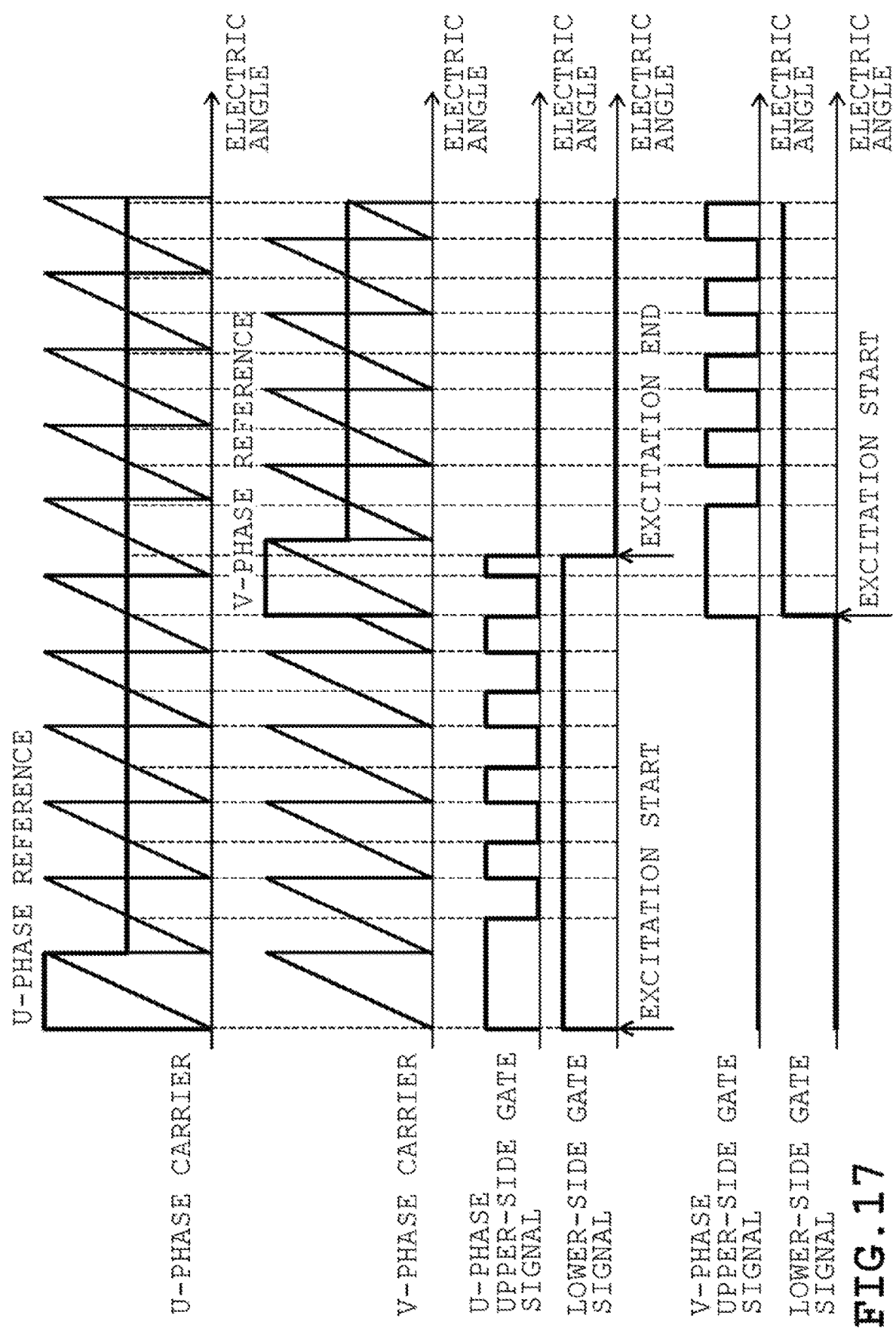
FIG. 17 is a timing chart illustrating the operation of the present embodiment (part 2).
Figure 18:
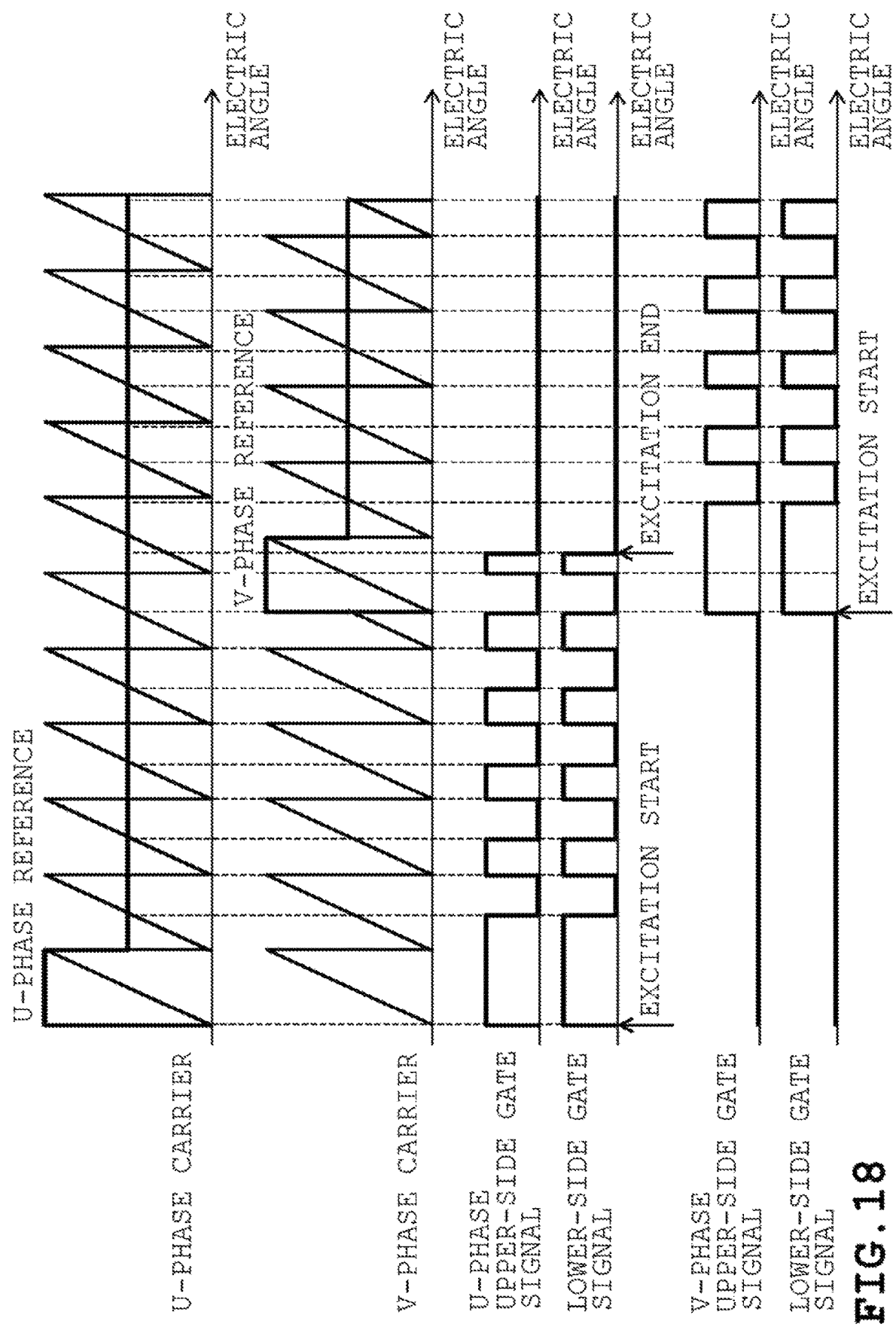
FIG. 18 is a timing chart illustrating the operation of the present embodiment (part 3).
Figure 19:
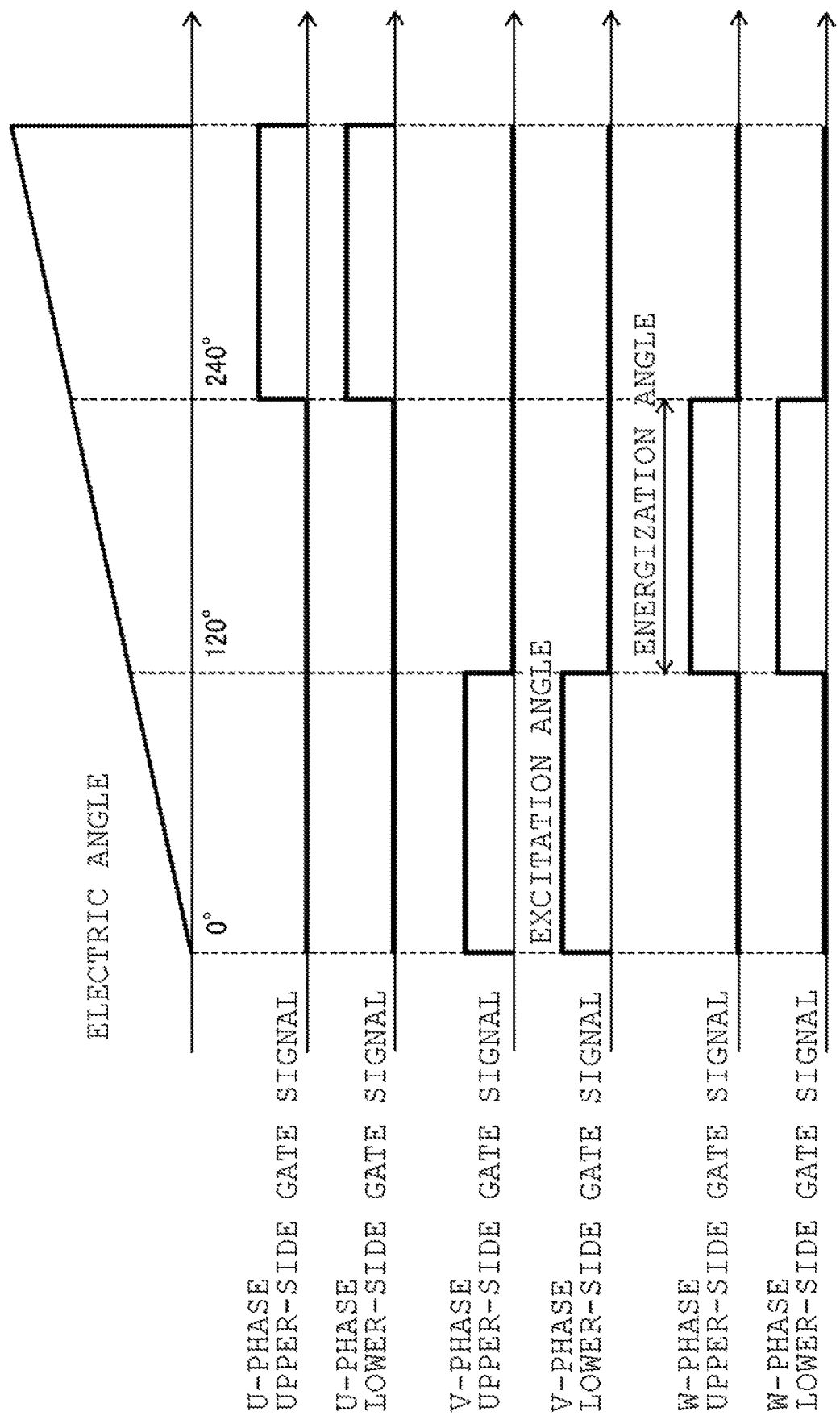
FIG. 19 is a timing chart illustrating the operation of the present embodiment (part 4).
Figure 20:
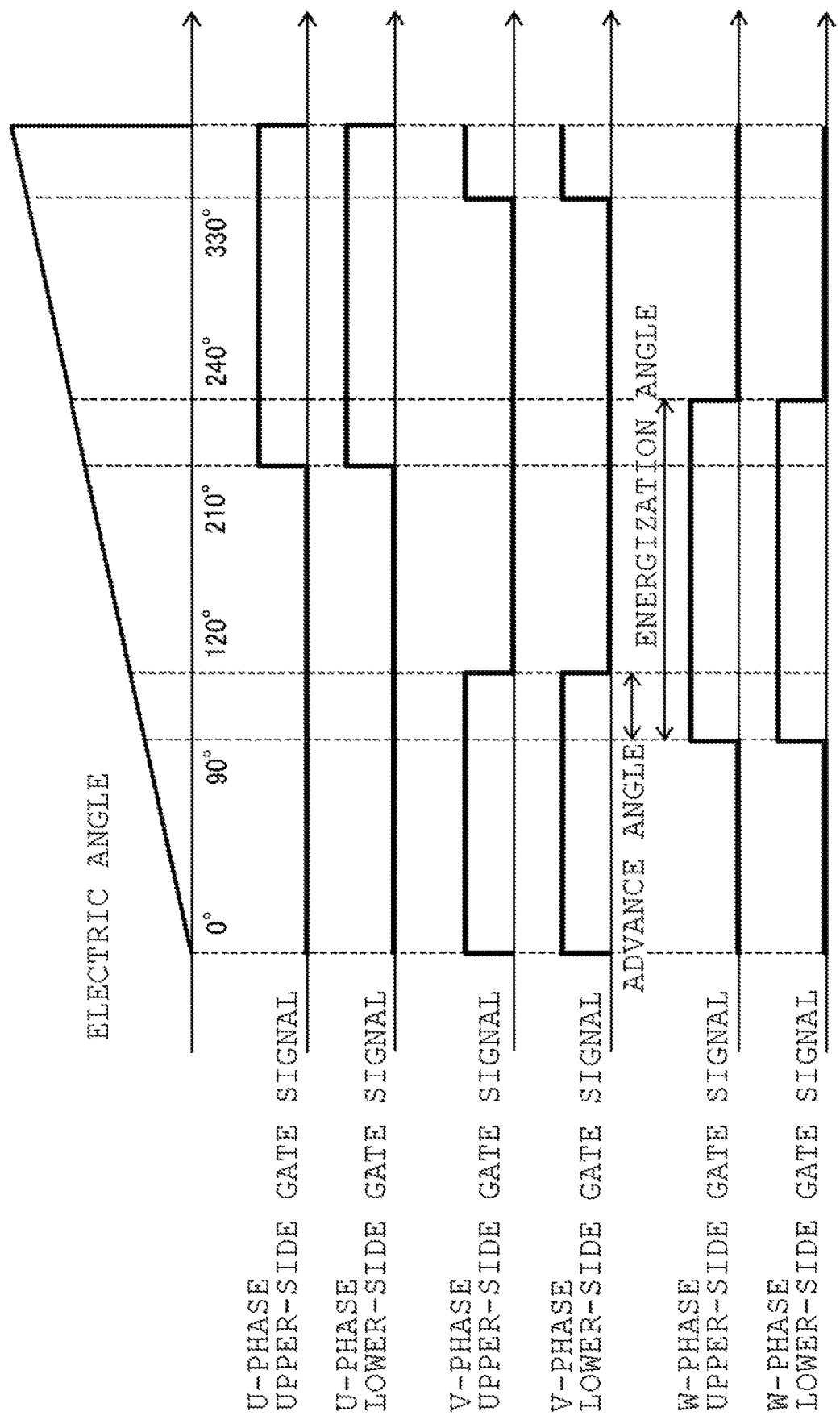
FIG. 20 is a timing chart illustrating the operation of the present embodiment (part 5).
Figure 21:
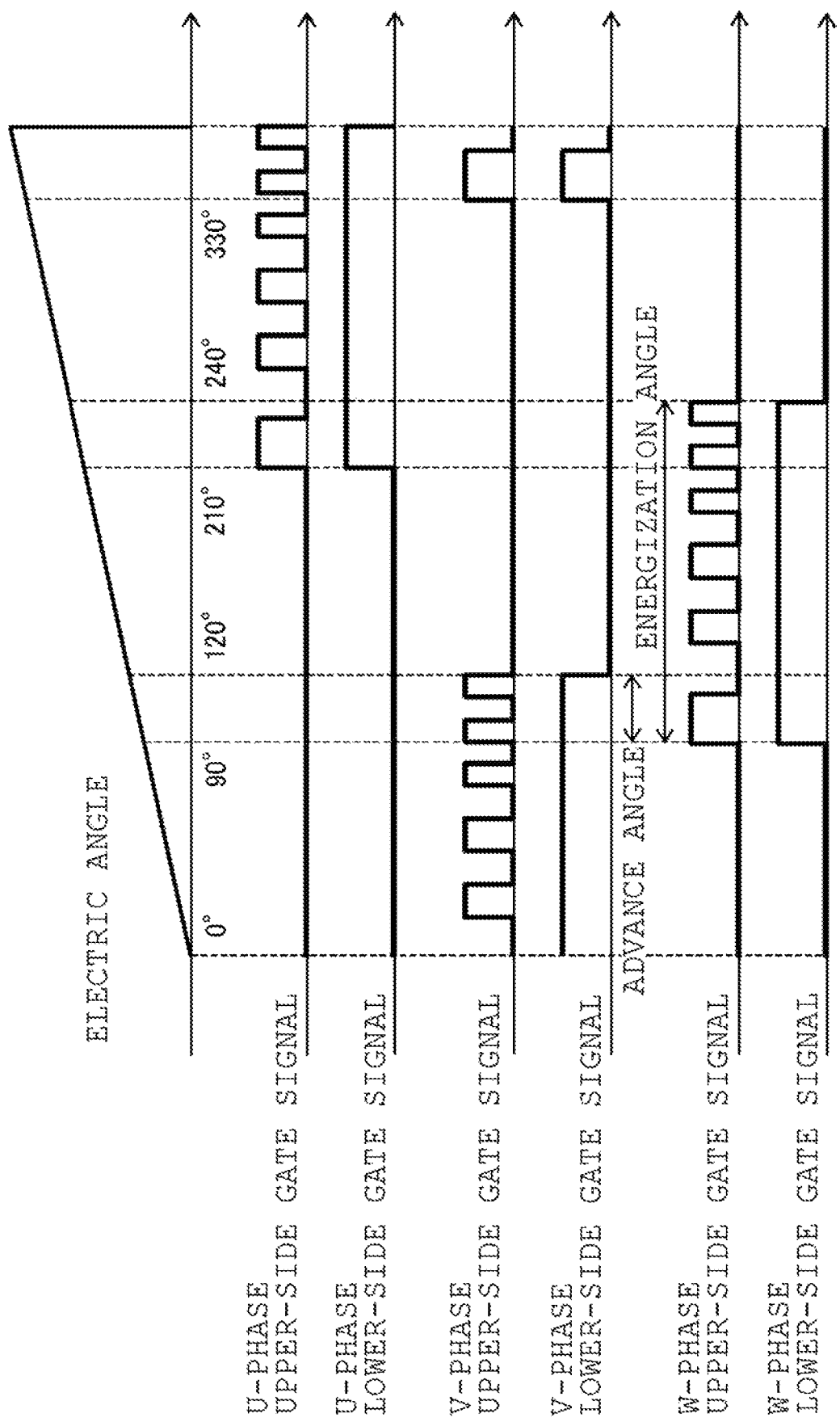
FIG. 21 is a timing chart illustrating the operation of the present embodiment (part 6).
Figure 22:
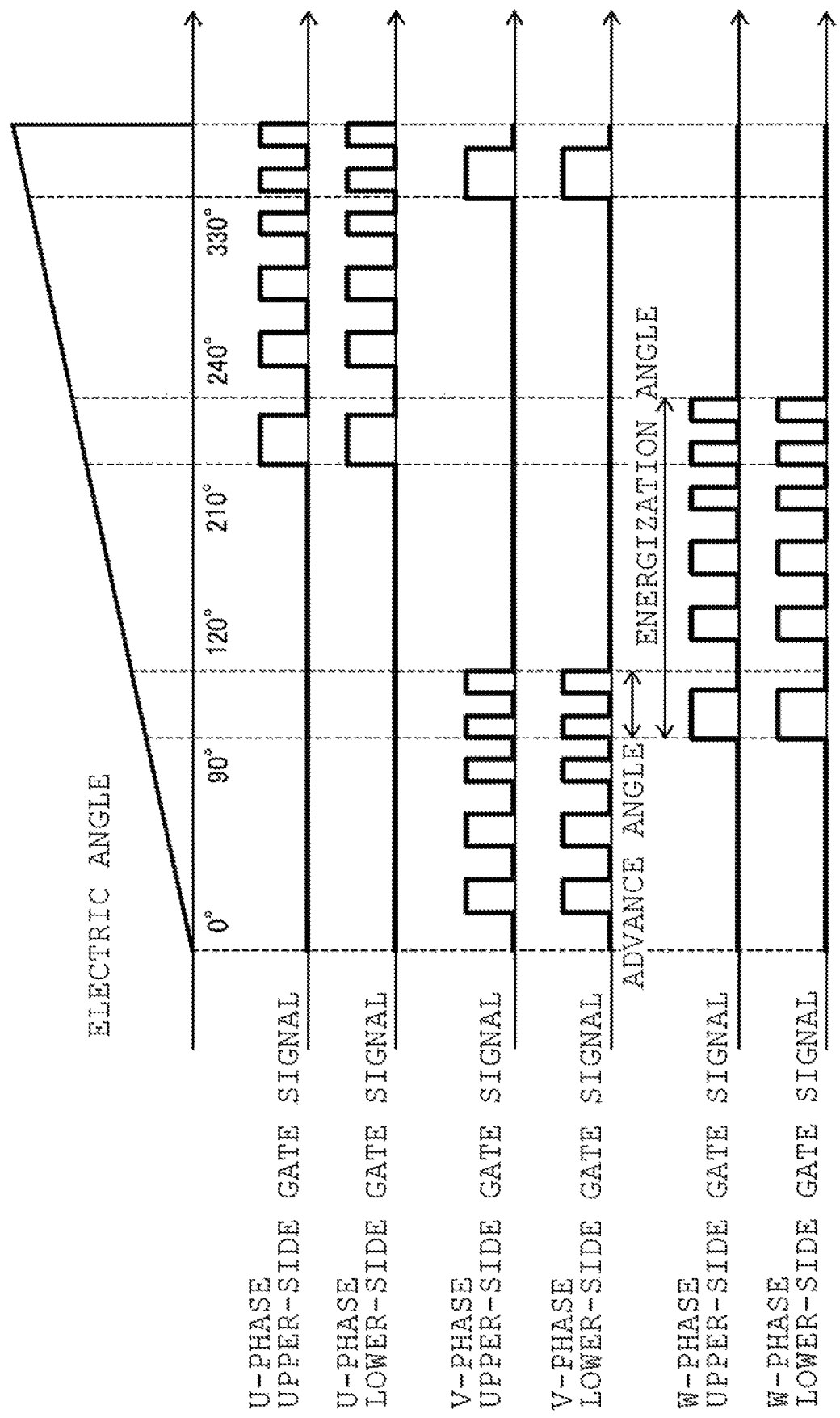
FIG. 22 is a timing chart illustrating the operation of the present embodiment (part 7).

FIG. 17 illustrates output mode P(2) and executes the back flow mode while the upper side is turned off. FIG. 18 illustrates the output mode P(1) which does not execute the back flow mode. FIG. 19 represents a case in which the output pulse count is set to "1" in output mode R (1) and illustrates a waveform in which 1 pulse of rectangular wave is outputted having an advance angle of 0 degrees and an energization angle of 120 degrees. FIG. 20 represents the same output mode as FIG. 19 and illustrates a waveform in which 1 pulse of rectangular wave is outputted having an advance angle of 30 degrees and an energization angle of 150 degrees. FIG. 21 illustrates a waveform of output mode R (2) having an advance angle 30 degrees. FIG. 22 illustrates a waveform of output mode R (1) having an advance angle 30 degrees.

Figure 23:
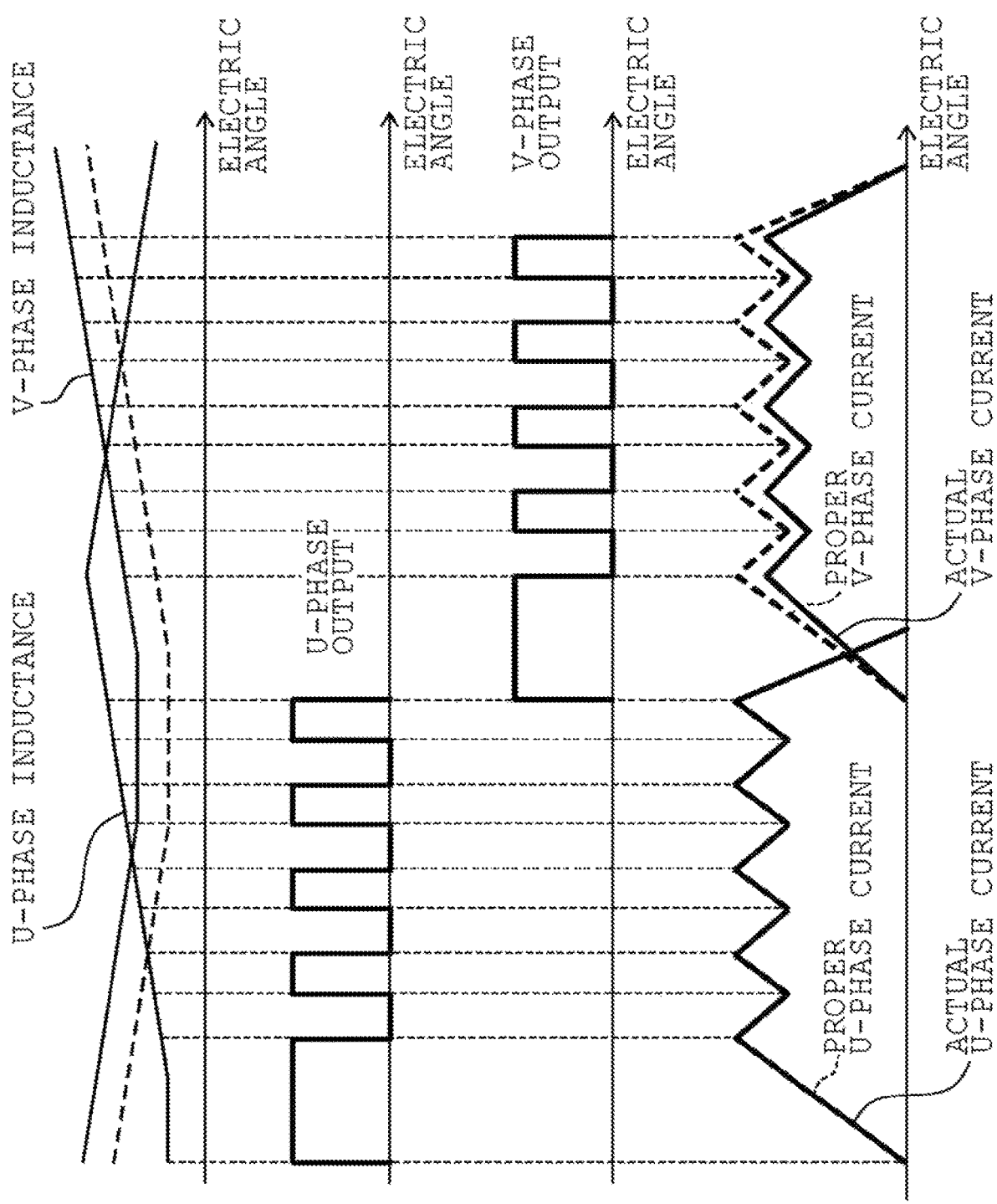
FIG. 23 is a timing chart illustrating the current waveforms obtained when rectangular wave pulses having the same waveform are outputted in a case where inductance differs in windings of each phase.
Figure 24:
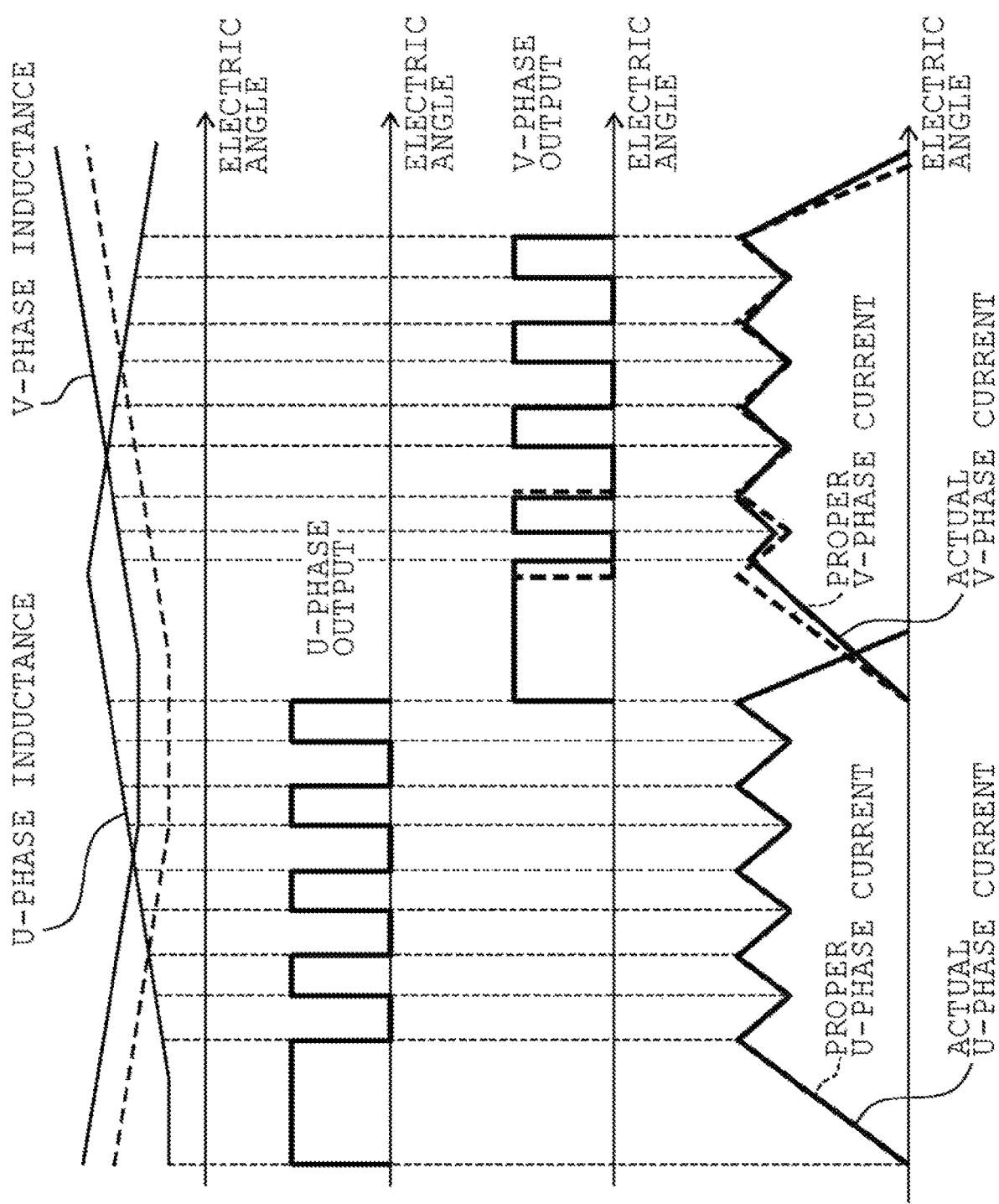
FIG. 24 is a timing chart illustrating the operation of the present embodiment (part 8).

FIG. 23 illustrates the current waveforms being outputted when rectangular wave pulses having the same waveform are outputted in the case where inductances differ in the windings of each phase. In the example shown in FIG. 23, the inclinations of the inductances are the same and thus, the torque generated in the V phase becomes smaller than the torque generated in the U phase. In order to suppress torque ripple originating from variations of inductance in each phase, it is effective to arrange the rectangular wave output portion 14 to set an appropriate waveform for each phase as illustrated in FIG. 24.

According to the above described embodiment, the PWM generator 15 generates a PWM signal to be outputted to the drive circuit 11 that energizes the windings of the SR motor 1 and the rectangular wave generator 14 outputs a rectangular wave signal of 1 pulse or more to the drive circuit 11 in 1 drive period of each phase based on the rotational position of the SR motor 1. The PWM generator 15 synchronizes the timing for starting the generation of the carrier of the PWM signal with the rising of the rectangular wave signal.

The drive signal switcher 31 executes switching so that a PWM drive by the PWM signal is performed when the rotational speed of the SR motor 1 is equal to or lees than the threshold value and the rectangular wave drive by the rectangular wave signal is performed when the rotational speed of the SR motor 1 is greater than the threshold value. As a result, if is possible to conduct desired current by the rectangular wave drive even in regions where the SR motor 1 rotates at high speeds and allow switching between PWM drive and rectangular wave drive while suppressing torque variation.

In this case, the drive signal switcher 31 is provided with the capture portions 33A and 33B and the comparator 38 that compare the frequency obtained by multiplying the electric angle frequency of the SR motor 1 by the pulse count of the rectangular wave signal outputted by the rectangular wave generator 14 with the frequency of the PWM carrier. The drive signal switcher 31 switches the drive methods based on the result of comparison. It is thus, possible to appropriately evaluate the rotation count in which the switching of drive methods is performed based on the pulse count of the rectangular wave signal.

Further, the rectangular wave generator 14 is rendered capable of setting the pulse waveform to be outputted in 1 drive period independently for each phase. It is thus, possible to suppress torque ripple originating from variation of inductance among the phases. Further, the rectangular wave generator 14 outputs only 1 pulse in 1 drive period while the PWM drive is selected by the drive signal switcher 31. It is thus, possible to prevent generation of multiple unnecessary rectangular wave pulses.

Other Embodiments

The number of salient poles of the SR motor 1 and the frequency of the PWM carrier, etc. may be modified depending upon design requirements.

The configuration of enabling the rectangular wave generator 14 to set the pulse waveform to be outputted in 1 drive period independently for each phase may be employed on a required basis.

The synchronization of the timing to start generation of the carrier of the PWM signal with the rising of the rectangular wave signal may alternatively be realized by causing the counter 19 to start counting or to be reset at the timing in which the output of the rectangular wave signal is started.

While certain embodiments have been described, these embodiments have been presented by way of example only, and are not intended to limit the scope of the inventions. Indeed, the novel embodiments described herein may be embodied in a variety of other former; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

We claim:

1. A motor control device comprising:
   a PWM generator configured to generate a PWM signal to be outputted to a drive circuit that energizes a winding of a switched reluctance motor;
   a rectangular wave generator configured to output a rectangular wave signal of 1 pulse or more to the drive circuit in 1 drive period of each phase based on a rotational position of the motor; and
   a drive signal switcher configured to execute switching so that a PWM drive by the PWM signal is performed when a rotational speed of the motor is equal to or less than a threshold value and a rectangular wave drive by the rectangular wave signal is performed when the rotational speed of the motor is greater than the threshold value;
   wherein the PWM generator synchronizes a timing to start generation of a saw tooth wave signal which is a carrier of the PWM signal with rising of the rectangular wave signal,
   wherein the drive signal switcher includes a frequency comparator comparing a frequency obtained by multiplying an electric angle of the motor by a pulse count of the rectangular wave signal outputted by the rectangular wave generator with a carrier wave frequency of the PWM signal, the drive signal switcher switching a drive method based on a result of comparison.

2. The motor control device according to claim 1, wherein the rectangular wave generator sets a pulse waveform outputted in the 1 drive period independently for each phase.

3. The motor control device according to claim 2, wherein the rectangular wave generator outputs only 1 pulse in the 1 drive period while the PWM drive is selected by the drive signal switcher.

4. The motor control device according to claim 1, wherein the rectangular wave generator outputs only 1 pulse in the 1 drive period while the PWM driver is selected by the drive signal switcher.

* * * * *